(No Model.)
C. NIEKRENZ.
CAR COUPLING.
No. 287,849. Patented Nov. 6, 1883.
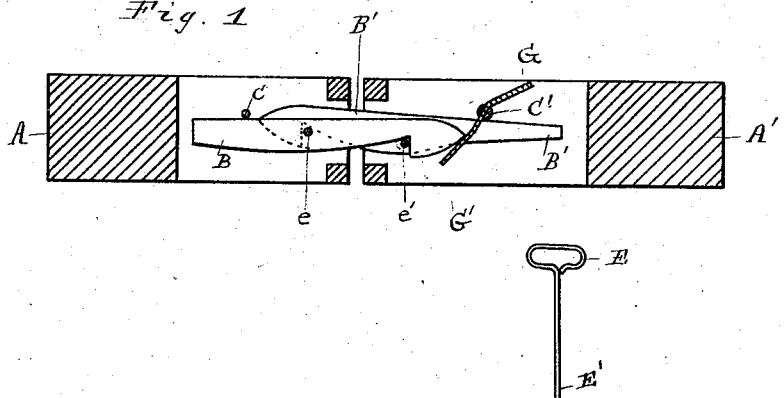
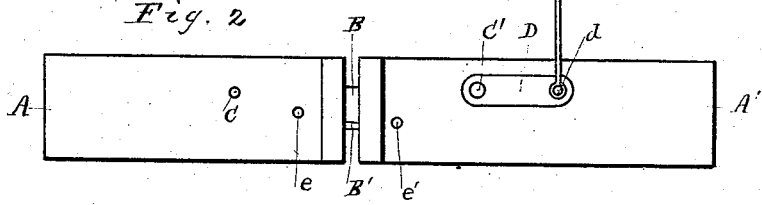
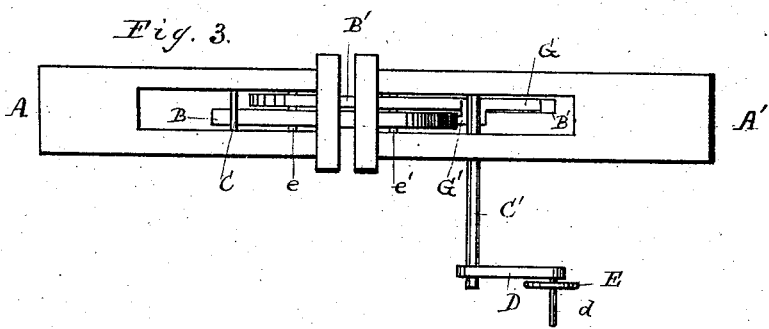
WITNESSES
Morton Toulmin
INVENTOR
Christian Niekrenz
N. W. Fitzgerald & Co
Attorney

UNITED STATES PATENT OFFICE.

CHRISTIAN NIEKRENZ, OF FARINA, ILLINOIS.

CAR-COUPLING.

SPECIFICATION forming part of Letters Patent No. 287,849, dated November 6, 1883.

Application filed July 2, 1883. (No model.)

*To all whom it may concern:*

Be it known that I, CHRISTIAN NIEKRENZ, a citizen of the United States, residing at Farina, in the county of Fayette and State of Illinois, have invented certain new and useful Improvements in Car-Couplers; and I do hereby declare the following to be a full, clear, and exact description of the invention, such as will enable others skilled in the art to which it appertains to make and use the same.

This invention relates to improvements in car-couplers, and has for its object to produce a coupler which shall be automatic in its action in coupling, and which may be uncoupled from the top or the side of the car. These objects are attained by the mechanism illustrated in the accompanying drawings, forming a part of this specification, in which—

Figure 1 is a longitudinal section. Fig. 2 is a side elevation. Fig. 3 is a plan.

The letter A indicates one of the draw-heads, and A' the other, which may be attached to the body of the car in any convenient manner.

B B' are hooks pivoted to draw-heads A A', respectively, by pivots or bolts $e$ $e'$.

C is a bolt or pin in draw-head A, which acts as a stop to prevent the hook B from falling too much out of a horizontal position. The bolts $e$ $e'$ serve as catches to engage with the hooked portions of the hooks B B' when coupling the cars.

C' is a shaft which extends through the draw-head and outwardly beyond the side of the car, either at one or both ends. It has a crank or handle, D, and handle $d$, to which is attached a rod, E', which extends upwardly to the top of the car, and is provided with a handle, E. The shaft C has also a piece of metal, G, of the form shown in Figs. 1 and 2, which passes through a central opening or slot in the shaft. The end G' of this piece of metal is placed under the end of the hook B, and the end G is above the rear end of the hook B'. This position of the parts G G' enables the hooks B B' to be simultaneously disengaged from the bolts $e$ $e'$ by turning the crank D in a downward direction, either by means of the handle $d$, if from the side of the car, or, if from the top, by means of the rod E' and its handle E.

In coupling, the sloping form of the under sides of the hooks B B' causes them to rise on striking the bolts $e$ $e'$ until the notched portion permits them to drop by their specific gravity, and thus complete the operation of coupling.

Having described my invention, what I desire to secure by Letters Patent, and to claim, is—

In a car-coupler, the draw-head A, having stop C, hook B, and bolt $e$, in combination with draw-head A', having hook B' and bolt $e'$, and provided with the uncoupling mechanism, shaft C', having metal cross-piece G G', crank D, and rod E', substantially as described, and for the purposes set forth.

In testimony whereof I affix my signature in presence of two witnesses.

CHRISTIAN NIEKRENZ.

Witnesses:
T. SCHRARVE,
WILHELM STORCK.